United States Patent
Schmidt

(10) Patent No.: US 10,260,376 B2
(45) Date of Patent: Apr. 16, 2019

(54) ENGINE TEST STAND MOUNTING APPARATUS AND METHOD

(71) Applicant: General Electric Company, Schenectady, NY (US)

(72) Inventor: Richard Schmidt, Loveland, OH (US)

(73) Assignee: General Electric Company, Schenectady, NY (US)

( * ) Notice: Subject to any disclaimer, the term of this patent is extended or adjusted under 35 U.S.C. 154(b) by 156 days.

(21) Appl. No.: 15/611,312

(22) Filed: Jun. 1, 2017

(65) Prior Publication Data

US 2018/0347405 A1 Dec. 6, 2018

(51) Int. Cl.
*F01D 25/28* (2006.01)
*B64F 5/60* (2017.01)
*G01L 5/13* (2006.01)
*G01H 1/00* (2006.01)

(52) U.S. Cl.
CPC .............. *F01D 25/285* (2013.01); *B64F 5/60* (2017.01); *G01H 1/003* (2013.01); *G01L 5/133* (2013.01)

(58) Field of Classification Search
CPC ....... F01D 25/285; G01L 5/133; G01H 1/003; B64F 5/60
See application file for complete search history.

(56) References Cited

U.S. PATENT DOCUMENTS

| | | | |
|---|---|---|---|
| 2,498,995 A | 12/1950 | Manning | |
| 3,218,849 A | 11/1965 | Marvinney et al. | |
| 3,449,947 A | 6/1969 | Ormond | |
| 5,170,662 A * | 12/1992 | Brault | G01L 5/133 73/112.04 |
| 5,396,791 A | 3/1995 | Mollmann et al. | |
| 7,568,382 B2 * | 8/2009 | Pruszenski | G01L 5/133 73/114.15 |
| 7,819,019 B2 | 10/2010 | Bisgaard | |
| 8,297,917 B1 * | 10/2012 | McCune | F01D 25/164 415/124.1 |
| 9,454,911 B2 | 9/2016 | Finigan et al. | |
| 9,551,630 B2 * | 1/2017 | Bertin | G01M 15/02 |
| 9,863,326 B2 * | 1/2018 | Sheridan | F02C 7/36 |
| 2001/0029779 A1 * | 10/2001 | Malbrouck | G01L 5/133 73/116.03 |
| 2008/0271523 A1 | 11/2008 | Marsh et al. | |
| 2009/0320578 A1 | 12/2009 | Peltzer et al. | |

(Continued)

*Primary Examiner* — Freddie Kirkland, III
(74) *Attorney, Agent, or Firm* — General Electric Company; Pamela Kachur

(57) ABSTRACT

A compliant mounting adapter for mounting an engine to a test stand includes: a body having: a first mounting interface configured for being coupled to the test stand; a second mounting interface configured for being coupled to the engine, the second mounting interface spaced-away from the first mounting interface; and a spanning element interconnecting the first and second mounting interfaces. The body is sufficiently flexible so as to permit movement relative movement of the two mounting interfaces, in response to forces generated by engine operation, in at least two degrees of freedom, and has a predetermined stiffness in each of the at least two degrees of freedom, with the predetermined stiffness of each degree of freedom being substantially independent from the stiffness of the other degrees of freedom.

20 Claims, 6 Drawing Sheets

(56) References Cited

U.S. PATENT DOCUMENTS

| | | | |
|---|---|---|---|
| 2013/0068005 A1* | 3/2013 | David | F02K 9/96 |
| | | | 73/116.03 |
| 2015/0285709 A1* | 10/2015 | Bertin | G01M 15/02 |
| | | | 248/309.1 |

* cited by examiner

ENGINE TEST STAND MOUNTING APPARATUS AND METHOD

BACKGROUND OF THE INVENTION

The present invention relates generally to engine testing, and more specifically, to a stationary test stand for supporting an aircraft gas turbine engine during power testing.

Aircraft gas turbine engines include various rotors having blades rotating therewith such as fan, compressor, and turbine blades which generate vibratory excitation forces during operation. Accordingly, the engine is conventionally designed to maximize the margin between the various operational excitation frequencies and the critical frequencies associated with the natural resonance modes of vibration to minimize undesirable vibration and to obtain acceptable engine life.

The vibratory response of the engine is typically affected by its supporting structure in the aircraft. For example, an aircraft engine is typically mounted to an aircraft wing by a conventional pylon. The combination of the aircraft wing and pylon have inherent flexibilities in each of the six spatial degrees of freedom.

During the development of an aircraft gas turbine engine the various stator and rotor components thereof must be designed to obtain suitably low vibration during operation. In order to be certified for an aircraft application, the engine is tested for vibratory response to ensure acceptable vibratory levels. Upon completion of the certification program and during production of the engines, each engine is typically tested before shipment in a conventional stationary test stand to ensure acceptably small levels of vibration.

A typical test stand includes a vertical support column suitably mounted to a foundation in the ground, with a head frame at the top thereof from which individual aircraft engines are mounted for testing. During ground testing, the engine is operated at various levels of output power thrust and various components thereof are monitored for vibration levels. Conventional test stands typically include a removable adapter which mounts the engine and pylon to the test stand head frame for allowing ready assembly and disassembly of the engine to the test stand.

One problem with this arrangement is that the test stand itself and the test stand adapter are rigid structures having a spring constant much greater than that of the stiffness of the airframe (e.g. wing and/or pylon). Therefore, the loads and vibration characteristics experienced by the engine in testing does not have perfect fidelity.

BRIEF DESCRIPTION OF THE INVENTION

This problem is addressed by a providing a compliant engine test stand mounting adapter having multiple degrees of freedom, with the stiffness in each degree of freedom being substantially independent from that of the other degrees of freedom.

According to one aspect of the technology described herein, a compliant mounting adapter for mounting an engine to a test stand, includes: a body having: a first mounting interface configured for being coupled to the test stand; a second mounting interface configured for being coupled to the engine, the second mounting interface spaced-away from the first mounting interface; and a spanning element interconnecting the first and second mounting interfaces. The body is sufficiently flexible so as to permit relative movement of the two mounting interfaces, in response to forces generated by engine operation, in at least two degrees of freedom, and has a predetermined stiffness in each of the at least two degrees of freedom, the predetermined stiffness of each degree of freedom being substantially independent from the stiffness of the other degrees of freedom.

According to another aspect of the technology described herein, an engine testing apparatus includes: a test stand having a rigid vertical support column with a first end fixedly joined to a stationary foundation, and a second end having a rigid head frame fixedly joined thereto; one or more rigid mounting components configured to mechanically couple an engine to the head frame; and a compliant mounting adapter mechanically coupled to one of the rigid mounting components, the compliant mounting adapter having: a body including: a first mounting interface mechanically coupled to the test stand; a second mounting interface spaced-away from the first mounting interface; and a spanning element interconnecting the first and second mounting interfaces. The body is sufficiently flexible so as to permit relative movement of the two mounting interfaces, in response to forces generated by engine operation, in at least two degrees of freedom, and has a predetermined stiffness in each of the at least two degrees of freedom, with the predetermined stiffness of each degree of freedom being substantially independent from the stiffness of the other degrees of freedom.

According to another aspect of the technology described herein, a method of testing an engine includes: mounting the engine to a rigid test stand through one or more rigid mounting components, wherein the engine is coupled to the test stand directly or indirectly through a compliant mounting adapter, wherein the compliant mounting adapter is sufficiently flexible so as to permit relative movement of the interconnected components, in response to applied forces generated by operation of the engine, in at least two degrees of freedom, and has a predetermined stiffness in each of the at least two degrees of freedom, with the predetermined stiffness of each degree of freedom being substantially independent from the stiffness of the other degrees of freedom; and operating the engine while it is mounted to the test stand.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
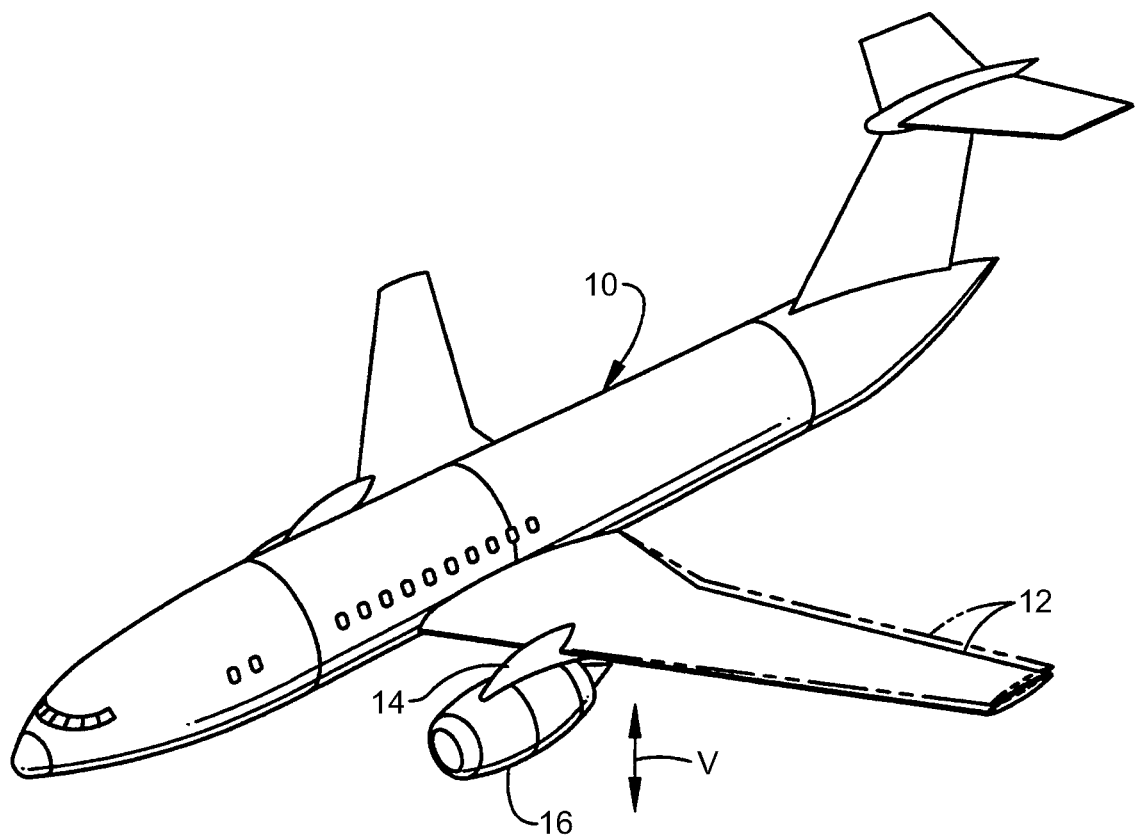
FIG. 1 is a perspective view of a portion of an exemplary aircraft having a wing-mounted gas turbine engine.

Now, referring to the drawings wherein identical reference numerals denote the same elements throughout the various views, FIG. 1 depicts an exemplary aircraft 10 having a wing 12 which includes a conventional pylon 14 supporting a conventional turbofan aircraft gas turbine engine 16.

Figure 2:
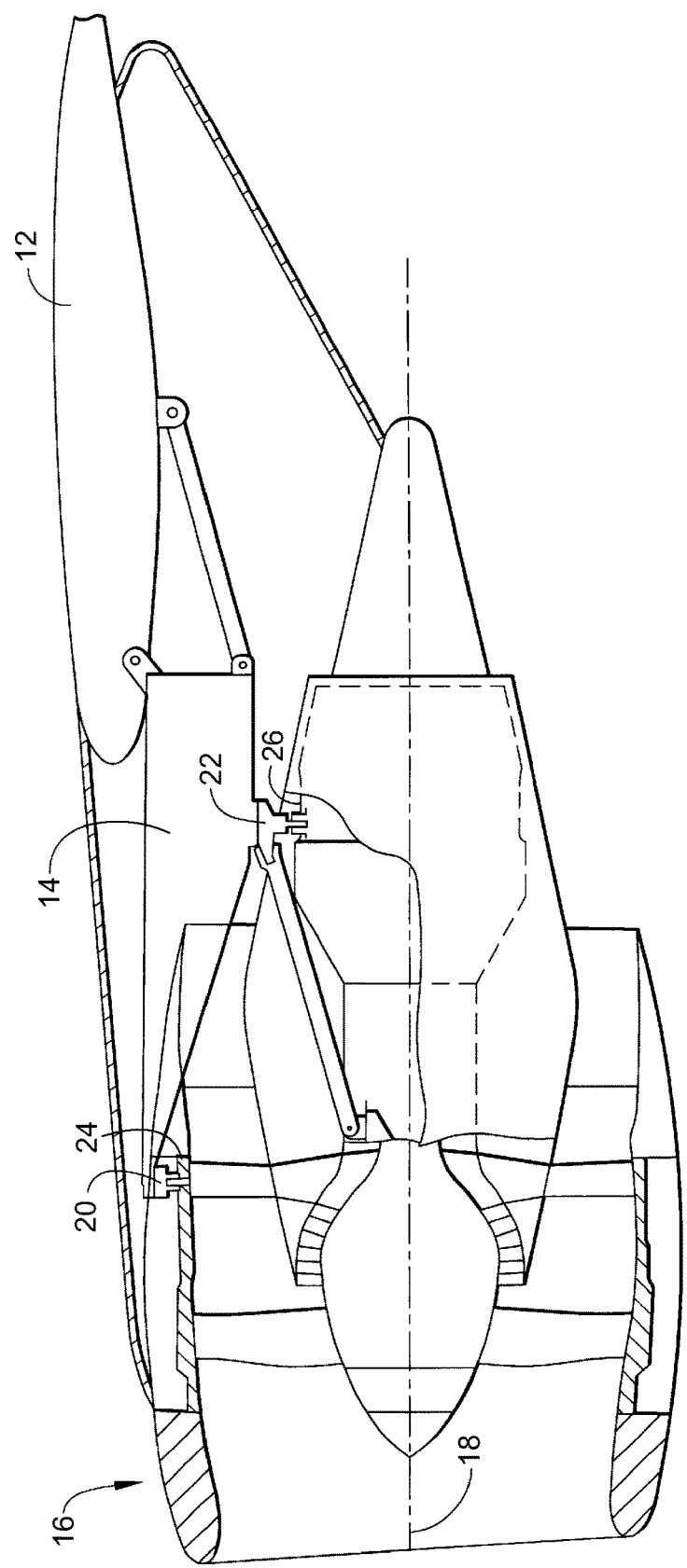
FIG. 2 is a partially-sectioned side elevation view of an engine and pylon of the aircraft shown in FIG. 1.

FIG. 2 shows the structure of the pylon 14 and the engine 16 in more detail. The engine 16 has a longitudinal or axial centerline axis 18 and is mounted to the pylon 14 at a forward mount 20 and an aft mount 22 spaced axially downstream from the forward mount 20. The forward mount 20 is joined to an annular fan casing 24. The aft mount 22 is joined to an annular engine casing 26 or some other stationary engine structure. The forward mount 20 and the aft mount 22 are joined to the pylon 14 by conventional means such as bolts, and the pylon 14 is in turn joined to the wing 12.

The wing 12 and pylon 14 combined have inherent flexibilities, for example as shown by the vertical movement thereof relative to the aircraft fuselage as represented by the vertical double-headed arrow labeled "V" in FIG. 1 and the solid and phantom line positions of the wing 12. In total, the wing 12 and the pylon 14 combined have compliance in in all six degrees of freedom, for example axial, lateral, vertical, roll, pitch, and yaw.

The engine 16 includes various rotors having fan, compressor, and turbine blades rotating therewith (not shown) which generate vibratory excitation forces during operation. The engine 16 is therefore conventionally designed to maximize the frequency margins between the excitation forces and the natural resonance modes of vibration of the engine for obtaining suitably low vibration levels thereof during operation. Since the engine 16 is supported by the conventional pylon 14 to the flexible wing 12, the installed system dynamics of the engine 16 can be affected by the flexibility of the wing 12 and/or pylon 14.

Figure 3:
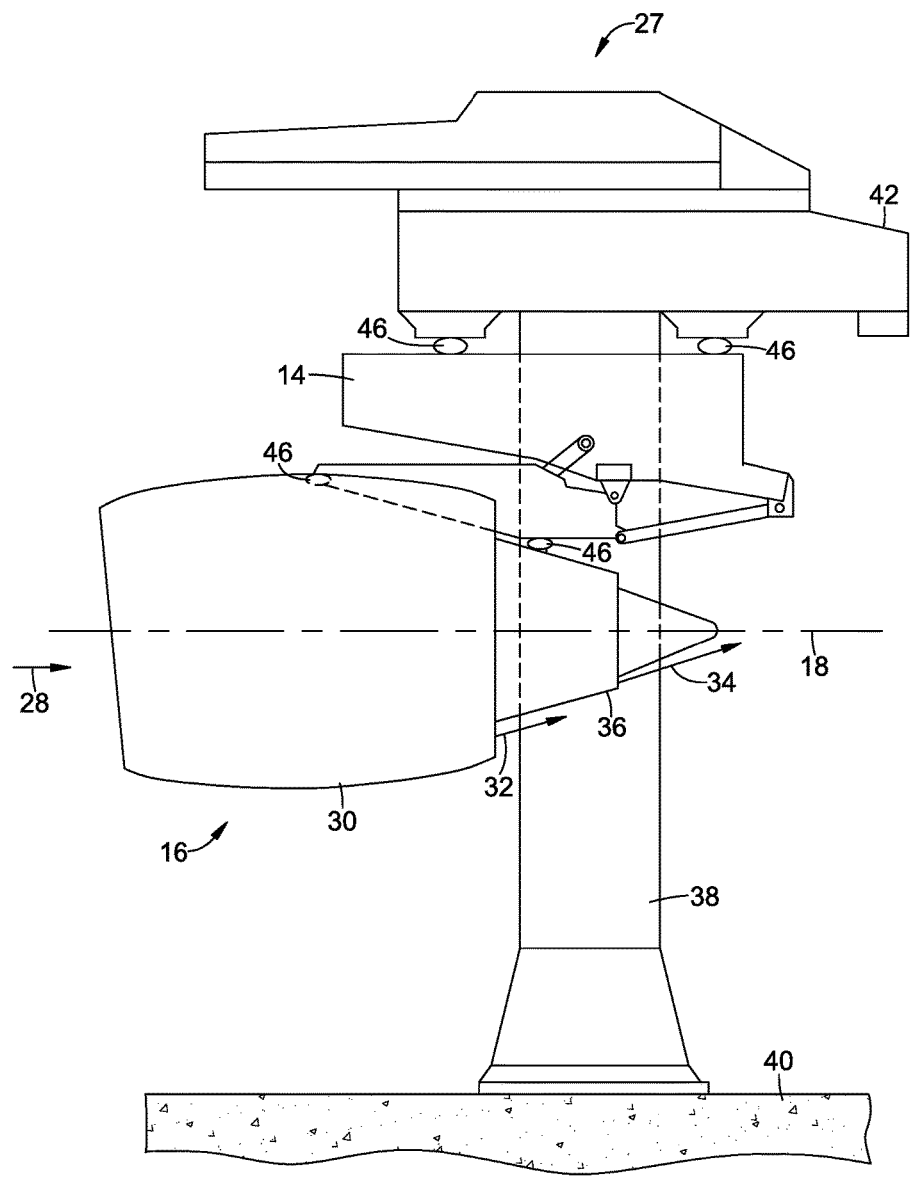
FIG. 3 is a schematic side elevational view of a test stand having an aircraft engine mounted thereto for testing, using exemplary compliant mounting adapters.

As shown in FIG. 3, a test stand 27 in accordance with one embodiment of the present invention provides predetermined flexibility to simulate the flexibility of the aircraft 10 shown in FIG. 1 in supporting the engine 16 for undergoing conventional vibratory ground testing. During ground testing, the engine 16 is conventionally operated for receiving and compressing ambient air 28 a portion of which is discharged from the outlet of the fan nacelle 30 as propulsion air 32 which provides thrust for propelling the aircraft. Another portion of the air is compressed inside the engine 16 and mixed with fuel and ignited to generate combustion gas 34 which is discharged from the outlet of the core exhaust nozzle 36 after energy therefrom has been extracted by one or more turbines.

The test stand 27 includes a substantially rigid vertical support column 38 fixedly joined at its lower end to a stationary foundation 40. The upper end of the column 38 supports a substantially rigid, conventional head frame 42 fixedly joined thereto. This is only a representative example and it will be understood that the principles described herein are equally applicable to other types of test stands, for example indoor test stands in which an engine is supported from an overhead structure such as a ceiling.

The engine 16 is mechanically coupled to the head frame 42 through a series of intervening mounting components. In the illustrated example a flight article pylon 14 (i.e. identical to one actually used to mount the engine 16 to the aircraft 10) is mounted to the head frame 42 through a rigid test stand adapter 44, and the engine 16 is mounted to the pylon 14. In other instances, the engine 16 would be coupled directly to the test stand adapter 44 and the pylon 14 would not be used.

According to the principles described herein, a compliant mounting adapter is provided at the interfaces between the mounting components for simulating the flexibility of the aircraft wing 12 and/or pylon 14. Exemplary compliant mounting adapters 46 are shown schematically shown in FIG. 3. The compliant mounting adapters 46 are used in pairs (one forward and one aft) and may be located either between the test stand adapter 44 and the head frame 42, or between the engine 16 and the pylon 14. If the pylon 14 is not used, then a pair of the compliant mounting adapters 46 may be disposed between the engine 16 and the test stand adapter 44. Both options are illustrated in FIG. 3, with the understanding that only one pair of the compliant mounting adapters 46 is required to achieve the function described herein.

Figure 4:
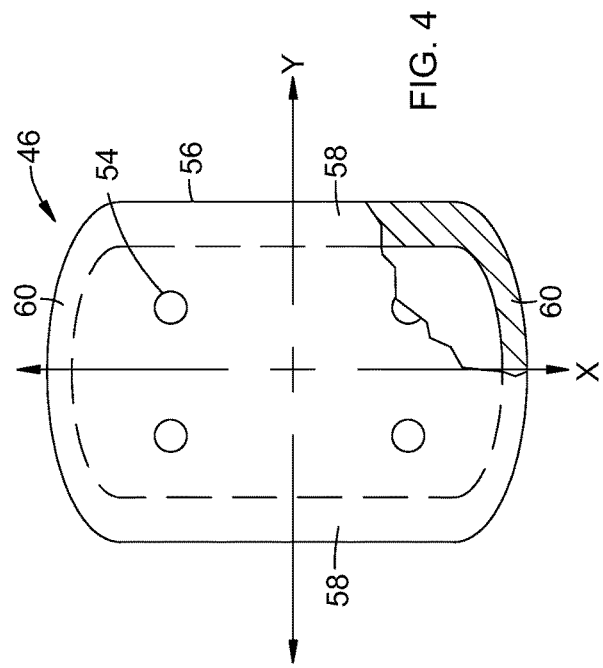
FIG. 4 is a schematic, partially-sectioned top plan view of an exemplary compliant mounting adapter.
Figure 5:
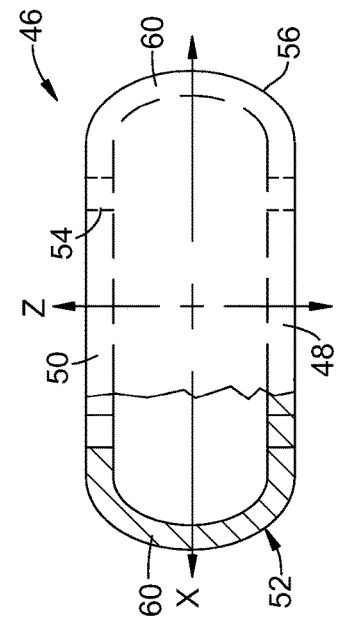
FIG. 5 is a schematic, partially-sectioned side elevation view of the compliant mounting adapter of FIG. 4.
Figure 6:
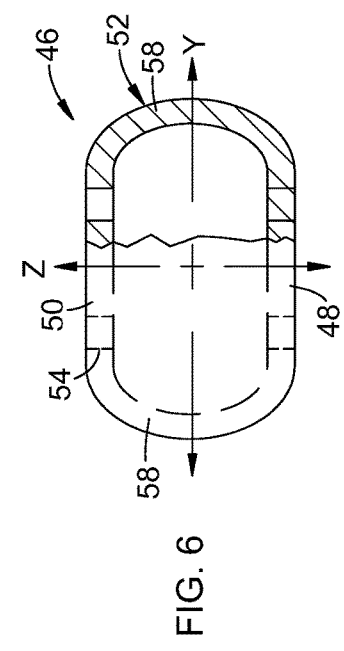
FIG. 6 is a schematic, partially-sectioned front elevation view of the compliant mounting adapter of FIG. 4.

An exemplary compliant mounting adapter 46 is shown in FIGS. 4-6. The compliant mounting adapter 46 has a body including a first mounting interface 48, a second mounting interface 50, and a spanning element 52 which interconnects the first and second mounting interfaces 48, 50.

Figure 7:
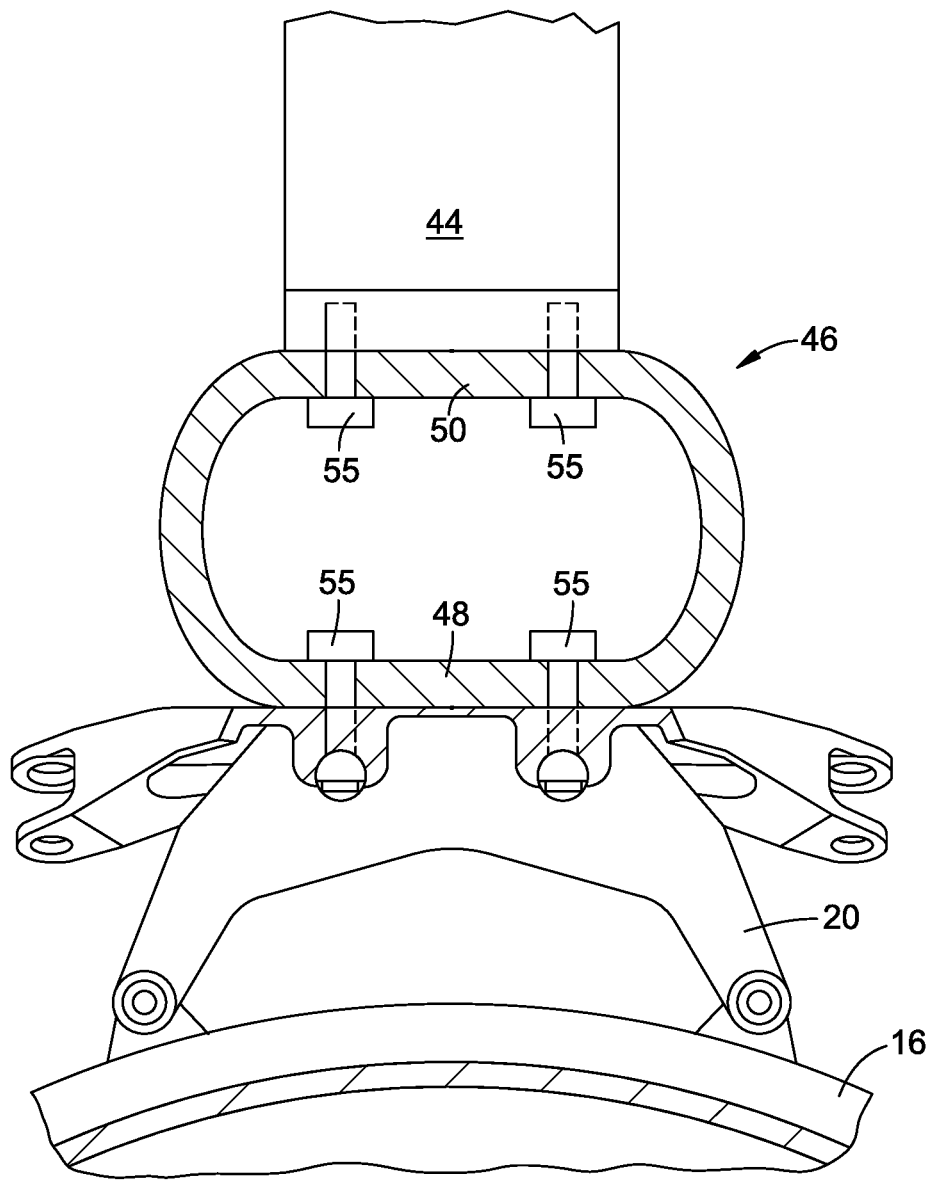
FIG. 7 is a schematic front elevation view of the compliant mounting adapter of FIG. 4 in combination with an engine mount and test stand adapter.

The first and second mounting interfaces 48, 50 are configured, respectively, to permit a secure mechanical connection between the compliant mounting adapter 46 and the engine 16, and between the compliant mounting adapter 46 and the test stand 27 (whether that connection is through a pylon 14 or a test stand adapter 44). In the illustrated example each mounting interface 48, 50 comprises a generally planar element such as a relatively thick metal plate having bolt holes 54 formed therein. FIG. 7 is an example showing one of the compliant mounting adapters 46 coupled to an engine mount (e.g. forward mount 20 described above) and to the test stand adapter 44, using bolts 55. Other types of connections are possible, for example the bolt holes 54 could be replaced by threaded studs (not shown) or by mechanical engaging elements, such as hooks or rails (not shown).

In the illustrated example the spanning element 52 comprises a closed perimeter wall 56 which is defined by a pair of spaced-apart, convex-curved side walls 58, joined by a pair of spaced-apart, convex-curved end walls 60. The perimeter wall 56 is depicted as being solid, but alternatively could incorporate a cage-like configuration having slots or holes (not shown).

The compliant mounting adapter 46 can be considered as a spring element permitting relative movement of the mounting interfaces 48, 50 in multiple degrees of freedom. The term "degree of freedom" is used herein consistent with its conventional meaning, referring to a direction in which independent motion can occur. For purposes of best fidelity in simulating the vibrational response of an airframe, the compliant mounting adapter 46 has at least four degrees of freedom subject to stiffness tuning, namely: directional or shearing and torsional or rotational stiffness about a longitudinal axis "X", denoted "thrust" and "roll", respectively; directional or shearing stiffness about a lateral axis "Y", denoted "lateral"; and directional or shearing stiffness about a vertical axis "Z", denoted "vertical". It will be understood that engine mount systems typically are designed so that they individually will not transmit yaw and pitch moment loading into the test stand 27, so the stiffnesses of the mounting adapter 46 in these directions are not influential. It is noted that the combination of separated forward and aft mount vertical and lateral loading produce an overall pitch and yaw moment, which is managed by the stiffnesses of the mounting adapter 46 in the vertical (for pitch) and lateral (for yaw) directions).

The compliant mounting adapter 46 may be configured in such a way that each degree of freedom can have its stiffness determined or "tuned" to a predetermined value separately from the stiffness of the remaining degrees of freedom, with little to no interaction therebetween. This may be described as the stiffnesses being "substantially independent" from each other. This simplifies the design process and is helpful to prevent undesirable or unpredictable interactions between the various degrees of freedom.

It is noted that the term "stiffness" is used herein consistent with its conventional meaning i.e., the ratio of applied force to deflection, with a stiffer element requiring a greater force to cause a specific deflection than a less stiff element. It will be understood that the stiffness of the compliant mounting adapter 46 in every degree of freedom may be much less than the stiffness of the other connecting components between the test and 27 and the engine 16, i.e. the head frame 42 and the test stand adapter 44. For example, the stiffness of the compliant mounting adapter 46 in every degree of freedom may be one-fifth or less of the stiffness of the other connecting components between the test and 27 and the engine 16. Stated another way, while no mechanical element has an infinite stiffness, it will be understood that the test stand 27 may be considered to be a "rigid" element, while the compliant mounting adapter 46 may be considered to be a "flexible" or "resilient" element.

Figure 8:
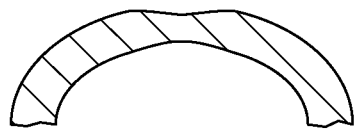
FIG. 8 is a series of schematic sectional view of a portion of a wall of a compliant mounting adapter, showing four possible thickness profiles.
Figure 8:
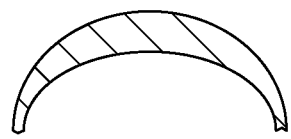
Figure 8:
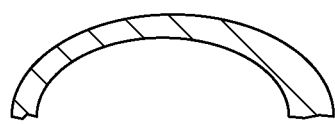
Figure 8:
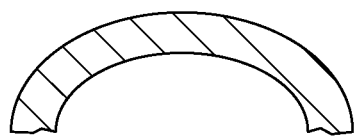

Multiple design parameters are available to determine the stiffness of the different degrees of freedom. For example, the overall length, width, and height of the compliant mounting adapter 46; the shape, size, and thickness profile of the first mounting interface 48; the shape, size, and thickness profile of the second mounting interface 50; the thickness profile of the side walls 58, and the thickness profile of the end walls 60. For example, FIG. 8 illustrates various possible thickness profiles, including (from left to right): uniform thickness, single-tapered from bottom to top, double-tapered, and concave (hourglass).

In general, almost any shape having a predictable stiffness could be used for the spanning element, such as one or more beams, rods, bars, struts, or springs. A closed hollow shape such as an ellipsoid, a tube, a rectangular parallelepiped, a cube, a trapezoid, a pyramid, or similar shape is more likely to have desirable design characteristics i.e., the ability to determine the stiffness of one degree of freedom while not affecting the stiffness of a different degree of freedom.

In the illustrated example, the complete body including the two mounting interfaces 48, 50 and the spanning structure 52 is a single integral, monolithic, or unitary whole. Alternatively, the body could be built up from two or more separate components manufactured separately and then coupled or joined together.

The body may be manufactured from any material that has adequate strength for the intended application and has mechanical properties which are sufficiently predictable to enable determination of its stiffness. Nonlimiting examples of suitable materials include metal alloys, polymers, and/or composite materials.

It will be understood that it is possible to manufacture the unique features needed to create the compliant mounting adapter 46 using an additive manufacturing process. "Additive manufacturing" is a term used herein to describe a process which involves layer-by-layer construction or additive fabrication (as opposed to material removal as with conventional machining processes). Such processes may also be referred to as "rapid manufacturing processes". Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Stereolithography (SLA), Electron Beam Melting (EBM), Laser Engineered Net Shaping (LENS), and Direct Metal Deposition (DMD).

In practice, the concept may be employed by first modeling the vibratory response characteristics of the aircraft 10, for example the wing 12 and pylon 14. For example, the aircraft 10 may be modeled using a conventional 3-D CAD or solid modeling software package such as UNIGRAPHICS and structural analysis may be carried out using a commercially available finite element analysis software package, such as NASTRAN or ANSYS. The output of this process would be a computed stiffness in each degree of freedom of the aircraft 10. Alternatively, experimental values for the stiffnesses could be used.

If considered necessary or desirable, the vibratory response characteristics of the test stand 27 may be modeled in a similar fashion. The output of this process would be a computed stiffness in each degree of freedom of the test stand 27.

The required physical configuration of the compliant mounting adapter 46 may then be determined such that its stiffness in each degree of freedom is equal to (or as close as practically possible to) those of the aircraft 10.

When the engine 16 is subsequently coupled to the test stand 27 using the compliant mounting adapters 46, testing may be carried out with good fidelity of the vibratory response characteristics as compared to the actual on-aircraft behavior. This will improve the accuracy of test results and reduce the time and cost needed for engine design and certification. In addition, it reduces the likelihood of requiring additional trim balancing when the engine is installed on the aircraft.

The foregoing has described a test stand mounting adapter for a gas turbine engine. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. A compliant mounting adapter for mounting an engine to a test stand, comprising:
    a body having:
        a first mounting interface configured for being coupled to the test stand;
        a second mounting interface configured for being coupled to the engine, the second mounting interface spaced-away from the first mounting interface;

a spanning element interconnecting the first and second mounting interfaces; and wherein the body is sufficiently flexible so as to permit relative movement of the two mounting interfaces, in response to forces generated by engine operation, in at least two degrees of freedom, and has a predetermined stiffness in each of the at least two degrees of freedom, with the predetermined stiffness of each degree of freedom being substantially independent from the stiffness of the other degrees of freedom.

2. The adapter of claim 1 wherein the first and second interfaces and the spanning element are part of a monolithic whole.

3. The adapter of claim 1 wherein the body is in the form of a closed hollow shape having a perimeter wall.

4. The adapter of claim 1 wherein the perimeter wall has as least one portion with a tapered wall thickness.

5. The adapter of claim 1 wherein each of the first and second interfaces comprises a plate having fastener holes formed therein.

6. The adapter of claim 1 wherein the body has a predetermined stiffness in four degrees of freedom, the predetermined stiffness of each degree of freedom being substantially independent from the stiffness of the other degrees of freedom.

7. The adapter of claim 1 wherein the stiffness in each of the at least two degrees of freedom is substantially equal to a corresponding stiffness of a pre-selected aircraft structure.

8. An engine testing apparatus, comprising:
a test stand having a rigid vertical support column with a first end fixedly joined to a stationary foundation, and a second end having a rigid head frame fixedly joined thereto;
one or more rigid mounting components configured to mechanically couple an engine to the head frame; and
a compliant mounting adapter mechanically coupled to one of the rigid mounting components, the compliant mounting adapter having:
a body including:
a first mounting interface mechanically coupled to the test stand;
a second mounting interface spaced-away from the first mounting interface;
a spanning element interconnecting the first and second mounting interfaces; and
wherein the body is sufficiently flexible so as to permit relative movement of the two mounting interfaces, in response to forces generated by engine operation, in at least two degrees of freedom, and has a predetermined stiffness in each of the at least two degrees of freedom, with the predetermined stiffness of each degree of freedom being substantially independent from the stiffness of the other degrees of freedom.

9. The apparatus of claim 8 further comprising an engine mechanically coupled to the head frame through directly or indirectly through the compliant mounting adapter.

10. The apparatus of claim 8 wherein the stiffness of the compliant mounting adapter in every degree of freedom is one-fifth or less of a stiffness of the test stand and the mounting components.

11. The apparatus of claim 8 wherein the mounting component comprises a rigid test stand adapter.

12. The apparatus of claim 8 wherein the first and second interfaces and the spanning element are part of a monolithic whole.

13. The apparatus of claim 8 wherein the body is in the form of a closed hollow shape having a perimeter wall.

14. The apparatus of claim 13 wherein the perimeter wall has as least one portion with a tapered wall thickness.

15. The apparatus of claim 8 wherein each of the first and second interfaces comprises a plate having fastener holes formed therein.

16. The apparatus of claim 8 wherein the body has a predetermined stiffness in four degrees of freedom, the predetermined stiffness of each degree of freedom being independent from the stiffness of the other degrees of freedom.

17. A method of testing an engine, comprising:
mounting the engine to a rigid test stand through one or more rigid mounting components, wherein the engine is coupled to the test stand directly or indirectly through a compliant mounting adapter,
wherein the compliant mounting adapter is sufficiently flexible so as to permit relative movement of the interconnected components, in response to applied forces generated by operation of the engine, in at least two degrees of freedom, and has a predetermined stiffness in each of the at least two degrees of freedom, with the predetermined stiffness of each degree of freedom being substantially independent from the stiffness of the other degrees of freedom; and
operating the engine while it is mounted to the test stand.

18. The method of claim 17 wherein the rigid mounting components include a rigid test stand adapter, and the compliant mounting adapter is disposed between the test stand adapter and the engine.

19. The method of claim 17 wherein the stiffness of the compliant mounting adapter in every degree of freedom is one-fifth or less of a stiffness of the test stand and the mounting components.

20. The method of claim 17 wherein the compliant mounting adapter has a predetermined stiffness in four degrees of freedom, the predetermined stiffness of each degree of freedom being substantially independent from the stiffness of the other degrees of freedom.

* * * * *